BEST AVAILABLE COPY
DESIGN.
L. BROWN.
MAGAZINE FOR MOTION PICTURE MACHINE.
APPLICATION FILED OCT. 4, 1920.
Reissued Dec. 14, 1920. 15,002.
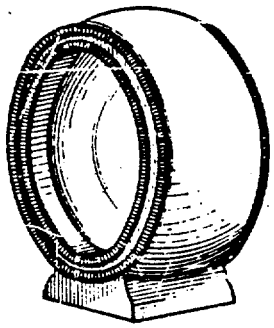
Inventor:
Lloyd Brown
by
James T. Buchalew
his Attorney.

BEST AVAILABLE COPY

UNITED STATES PATENT OFFICE.

LLOYD BROWN, OF LOS ANGELES, CALIFORNIA, ASSIGNOR TO SILENT DRAMA SYNDICATE, A TRUSTEESHIP, LLOYD BROWN AND ALEXANDER GRAYDON, TRUSTEES.

DESIGN FOR A MAGAZINE FOR MOTION-PICTURE MACHINES.

15,002. Specification for Reissued Design. Reissued Dec. 14, 1920.

Original No. 55,979, dated August 10, 1920, Serial No. 346,191, filed December 19, 1919, for 14 years. Application for reissue filed October 4, 1920. Serial No. 414,675. Term of patent 14 years.

*To all whom it may concern:*

Be it known that I, LLOYD BROWN, a citizen of the United States, residing at Los Angeles, in the county of Los Angeles, State of California, have invented a new, original, and ornamental Design for a Magazine for Motion-Picture Machines, of which the following is a specification, reference being had to the accompanying drawing, forming part thereof.

The figure is a perspective view of a magazine for motion picture machines, showing my new design.

I claim:

The ornamental design for a magazine for motion picture machines, as shown.

LLOYD BROWN.

Witnesses:

VIRGINIA I. BERINGER,
JAMES T. BARKELEW.